June 8, 1965 D. E. TRUMBULL ETAL 3,188,056
CARTRIDGE TYPE PLURAL COMPONENT MIXING AND DISPENSING DEVICE
Filed May 4, 1964 4 Sheets-Sheet 2
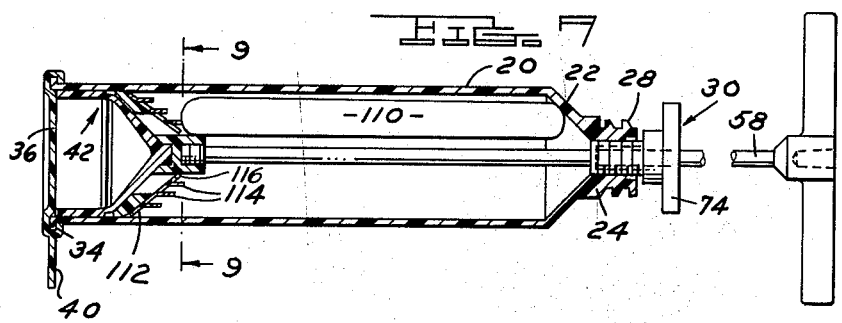
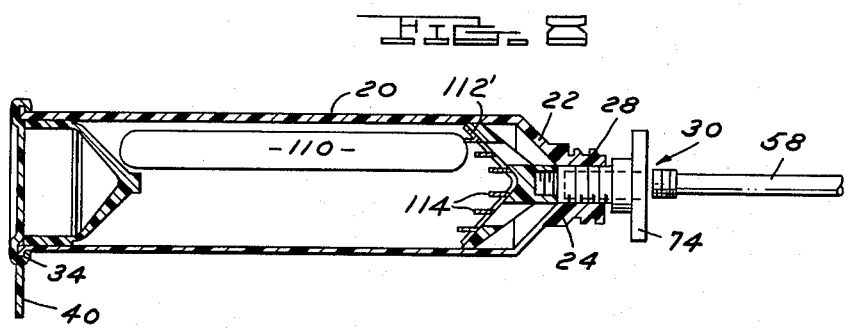
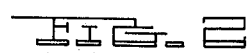
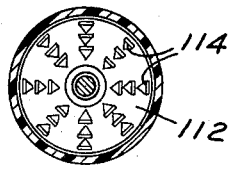
INVENTORS
DONALD E. TRUMBULL
CARL B. PENN
BY
Burton & Parker
ATTORNEYS

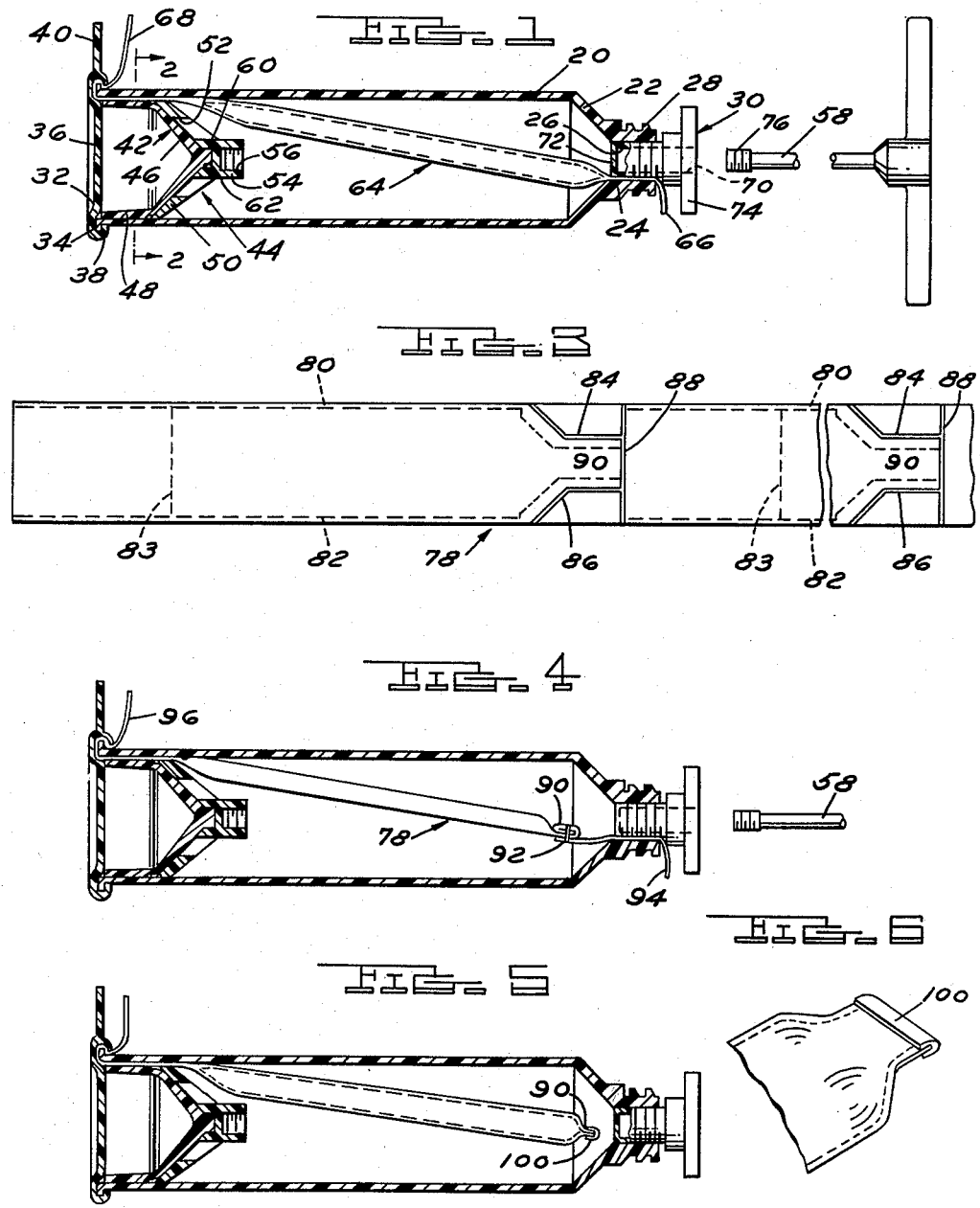

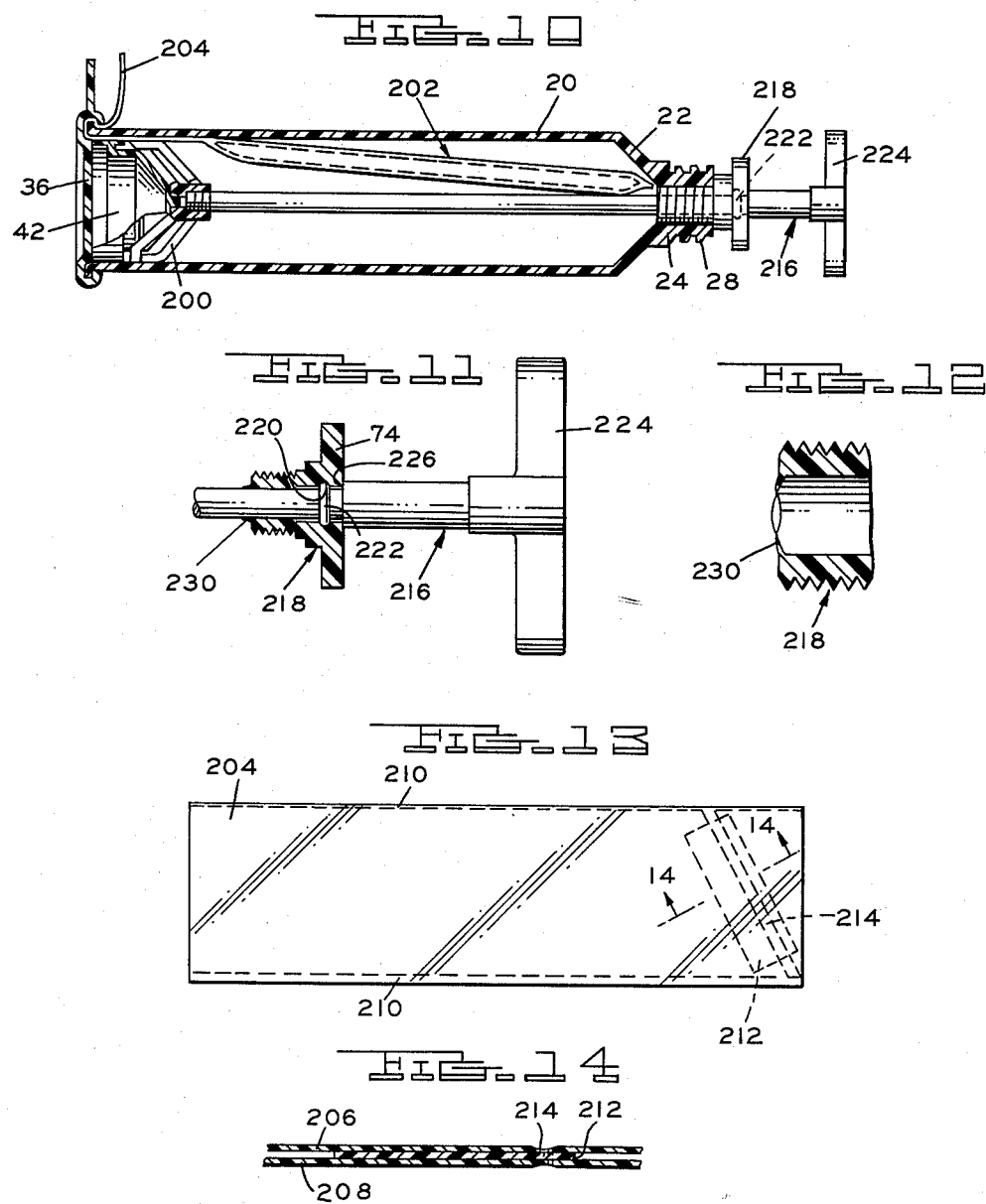

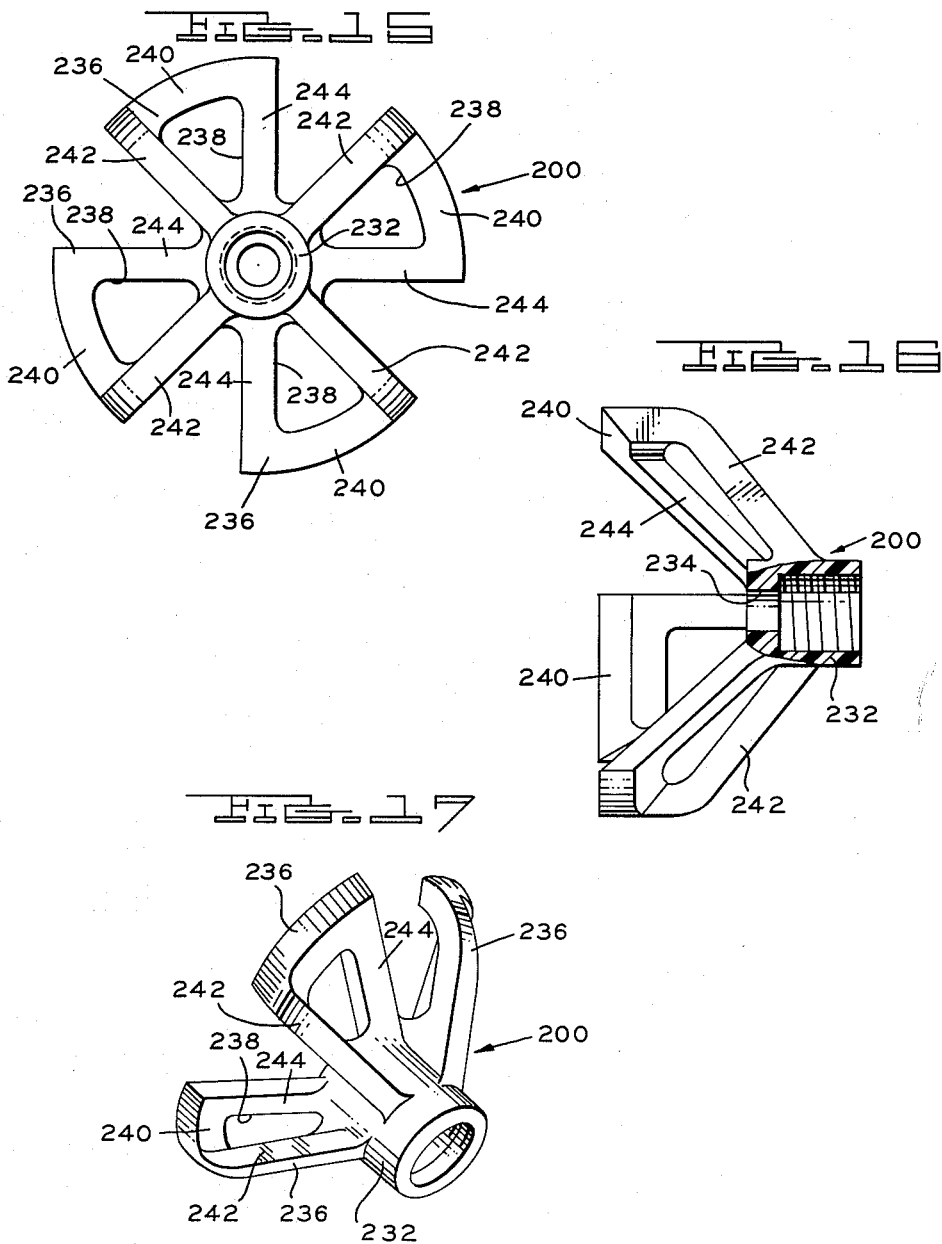

United States Patent Office 3,188,056
Patented June 8, 1965

3,188,056
CARTRIDGE TYPE PLURAL COMPONENT
MIXING AND DISPENSING DEVICE
Donald E. Trumbull and Carl B. Penn, Birmingham,
Mich., assignors to Pyles Industries, Inc., Southfield,
Mich., a corporation of Michigan
Filed May 4, 1964, Ser. No. 365,568
19 Claims. (Cl. 259—37)

This application is a continuation-in-part of our United States application Serial No. 302,087, filed August 14, 1963, and now abandoned.

This invention relates to a device for mixing and dispensing multi-component materials, and more particularly to a cartridge-type mixing and dispensing device wherein two or more component materials may be mixed together within a plastic cartridge from which the resultant mixture may thereafter be dispensed, the component materials being packaged in separate compartments within the cartridge for storage and shipment.

The materials with which the invention is principally concerned are sealants, adhesives, or the like, commercially known as polysulphides, epoxies, polyesters, polyurethanes, etc. which generally comprise a base component material and an accelerator or catalyst material. Upon mixing together of the base and catalyst, a reaction occurs to effect a curing of the mixture. The "cure time" of these multi-component mixtures varies depending on the particular material, temperature, etc. and in some instances the mixture will begin to cure in a matter of a few seconds. Hence it is imperative that the component materials be kept separated until immediately before use, at which time they must be intimately mixed together to provide a homogeneous product.

The base material and catalyst are commonly shipped to large scale users in separate containers, as for example metal drums or cans. Equipment is presently available which is capable of metering the individual component materials, mixing them together, and dispensing the resultant mixture. When large quantities of sealant compounds or the like are required, as for example to seal the joints and component parts of aircraft and/or the like, the premixed sealant is placed in a cartridge dispenser comprising a polyethylene, polypropylene, polyolefin, or other molded cartridge to which a nozzle may be connected, with a plunger in the cartridge to force the sealant through the nozzle upon the application of force to the rear of the plunger, and the dispensing of sealant from the cartridge effected by placing a filled cartridge in a sealant gun of the type shown in U.S. Patent No. 3,042,268. The metering and mixing equipment which is used to fill the individual cartridges is generally not portable in the sense that it could be carried about by the operator to the point of use. Therefore, the equipment is usually disposed at a central location for filling the cartridges with sealant or the like, and the filled cartridges are then utilized in the sealant gun to dispense the material.

While the above-mentioned equipment has been found to be ideally suited for large scale operations, it is obvious that such would be totally unsatisfactory for the small user who might require only a few cartridges of sealant at a time. As an illustrative example, an automobile manufacturer might provide several metering and mixing machines in an assembly plant for sealing the windshields and rear windows in automobile bodies. On the other hand, the cost of such equipment would be prohibitive for an automobile dealer or repair garage, which might have occasion to replace damaged windshields or rear windows say only a few times per month. Even more apparent is the position of a home owner who requires only a single cartridge of sealant material for a specific household project. There exists therefore, a very definite need to provide the small user with these multi-component materials in a readily usable form.

It is therefore a general object of the invention to provide a simple and inexpensive mixing and dispensing device for handling relatively small quantities of such materials, wherein the components may be mixed together within a cartridge or the like and thereafter dispensed at the point of use from the same cartridge, the components being packaged and stored in separated condition within the single cartridge until immediately prior to use.

Another object is the provision of a mixing and dispensing device for such material comprising a plastic cartridge within which the component materials may be mixed together by a dasher disposed within the cartridge, and wherein the catalyst material is stored in a separate envelope within the cartridge, while the base material is charged directly into the cartridge, with the catalyst envelope being readily openable to disperse the catalyst throughout the base component for mixing by the dasher and subsequent dispensing at the point of use directly from the cartridge.

A further object is the provision of a cartridge-type mixing and dispensing kit comprising a cylindrical plastic cartridge having a nozzle portion at its forward end, a dispensing plunger and a mixing dasher packaged within the cartridge, said cartridge being charged with a predetermined quantity of the base material and having packaged therein a separate closed envelope containing a predetermined quantity of the catalyst, wherein the catalyst envelope is readily openable to disperse the catalyst throughout the base material in the cartridge, and wherein means are provided for manipulating the dasher to intimately mix the materials together for subsequent dispensing of the resultant mixture through the cartridge nozzle by the shiftable movement of the plunger within the cartridge.

Other objects, advantages, and meritorious features will more fully appear from the specification, claims, and accompanying drawings, wherein:

FIG. 1 is a longitudinal sectional view of a device embodying the invention showing the cartridge and the catalyst envelope in the cartridge, with the plunger and the mixing dasher disposed at the rear end of the cartridge;

FIG. 2 is a cross-sectional view taken along line 2—2 of FIG. 1 showing a collapsed portion of the catalyst envelope entrapped between the plunger and the cartridge walls;

FIG. 3 is a top plan view of the catalyst envelopes showing a preferred form of the envelope and a method of making the same;

FIG. 4 illustrates a device similar to FIG. 1 but provided with a slightly different catalyst envelope and releasable closure therefor;

FIG. 5 illustrates a device of the same general character as FIG. 4, but provided with a slightly different envelope closure member;

FIG. 6 is an enlarged perspective view showing the forward end of the catalyst envelope of FIG. 5 with a closure member positioned thereon;

FIG. 7 illustrates a slightly different embodiment of the device illustrated in the preceding figures of the drawing;

FIG. 8 illustrates a device generally similar to FIG. 7 showing a slightly different arrangement of parts;

FIG. 9 is a cross-sectional view taken along line 9—9 of FIG. 7;

FIG. 10 is a longitudinal sectional view similar to FIG. 1 showing a slightly different embodiment of the invention;

FIG. 11 is an enlarged elevation, partly in section, of the mixing rod handle and closure plug of FIG. 10;

FIG. 12 is an enlarged sectional view of the detail of the closure plug shown in FIG. 11;

FIG. 13 is a top plan view of the catalyst envelope used in the embodiment shown in FIG. 10;

FIG. 14 is an enlarged cross-sectional view taken along line 14—14 of FIG. 13; and FIGS. 15, 16 and 17 are top plan, side elevation and perspective views respectively of the mixing rotor for the embodiment shown in FIG. 10.

While the drawings and the description thereof which follows are primarily directed to a device for handling the sealants, adhesives, etc. defined hereinabove comprising a base component and an accelerator or catalyst, it will be apparent to one skilled in the art that such a device may be provided for handling materials comprising more than two components. In fact, the device disclosed herein may be utilized wherever it is desired to provide a mixture of two or more components which are to be kept separated until immediately before use, at which time they are to be mixed together and subsequently dispensed.

Referring first to FIG. 1, there is shown therein a device embodying the invention comprising a generally cylindrical plastic cartridge 20 having a conically shaped forward end wall 22 terminating in a spout-like prolongation 24 at its apex defining an outlet opening 26. The spout 24 is preferably externally threaded as at 28 for threaded engagement with a dispensing nozzle or the like (not shown), and is likewise internally threaded for engagement with a threaded closure plug 30 adapted to sealingly engage the outlet opening 26. Cartridge 20 has an open rear end 32 provided with a peripheral transversely projecting bead 34. A closure cap 36 is provided for closing the rear end of the cartridge, said cap having a circumferential recess defining a lip 38 adapted to be snapped over the cartridge bead 34, and also provided with a projecting tab 40 to facilitate its attachment to and removal from the cartridge.

Disposed within the cartridge 20 at the rear end thereof are a cup-shaped plunger 42 and a mixing dasher 44. Plunger 42 has a conical forward end 46 and a rearwardly extending cylindrical skirt 48 closely fitting the interior cylindrical wall of the cartridge, and the plunger is adapted to be shifted within the cartridge to dispense material therefrom as, for example, by a sealant gun such as is shown in U.S. Patent No. 3,042,268. Mixing dasher 44 is provided with a plurality of blades 50 adapted to engage the cartridge walls, with each of the blades having openings 52 therethrough, and an axially forwardly projecting hub portion 54 internally threaded as at 56 for engagement with an externally threaded actuating rod 58 operable to manipulate the dasher as more fully described hereinafter. The dasher 44 exhibits a rear surface conforming to the conical wall 46 of the plunger, and a forward surface conforming to the interior of the cartridge conical forward wall 22, so that upon manipulation of the dasher within the cartridge to mix the component materials together, the dasher will engage the wall surfaces 22 and 46 respectively in intimate wiping contact, assuring complete mixing of all of the material within the cartridge. Plunger 42 is also provided with a forwardly projecting nose portion 60, while the dasher 44 exhibits a cooperating recess 62 within which the plunger nose 60 is slidably receivable, whereby the plunger and dasher may be releasably coupled together for insertion within the cartridge as a unit, but permitting the dasher to be uncoupled from the plunger during the mixing operation.

With the exception of the dasher actuating rod 58, all of the parts of the device hereinabove enumerated must be made of a material which will not deteriorate or chemically react with the components to be mixed and dispensed, and these parts must also be substantially fluid-impervious, non-brittle at low temperatures and relatively tough and resilient. In addition, as all of the parts are generally thrown away after the contents have been exhausted from the cartridge, all of the parts must be relatively inexpensive. Of the materials presently commercially available, polyethylene has been found to be the most ideally suitable material, and such has been utilized in the manufacture of these parts.

Also shown in FIG. 1 is a catalyst or accelerator envelope 64 positioned within the cartridge 20 as shown and being filled with a predetermined quantity of catalyst material. Envelope 64 is preferably made out of Mylar, registered trademark of E. I. du Pont de Nemours & Co. for polyethylene terephthalate resin, which material has been found satisfactory for such use, primarily because of its characteristics of outstanding strength and chemical inertness. The envelope 64 of FIG. 1 is constructed by placing two strips of the material one on top of the other, and applying heat to the longitudinally extending juxtaposed edges of the strips to heat seal them together, forming a tubular envelope open at both ends. Excellent results have been obtained using strips of the material approximately 2 mils in thickness. The dimensions of the envelope 64 may be varied depending on the quantity of catalyst required for a particular composition, and long rolls of the strips may be first heat sealed together, and then the resulting tube may be cut into appropriate lengths to suit individual requirements.

The device is designed to be filled and assembled at the factory for delivery to the consumer, and to this end machines are presently commercially available for accurately metering predetermined amounts of the base and catalyst materials and for filling the cartridge 20 and envelope 64 with metered amounts of the materials. To prepare the assembly of parts shown in FIG. 1 for delivery to the consumer, the open ended envelope 64 is first inserted into the empty cartridge 20, with the ends of the envelope projecting beyond respective ends of the cartridge. The forward end 66 of envelope 64 is held against the exterior of spout 24, and the plug 30 is then screwed into the spout, sealing the forward end of the envelope and retaining it in place. The cartridge 20 is then positioned with its open rear end 32 uppermost, and a predetermined quantity of catalyst material is dispensed into the open rear end 68 of the envelope from a suitable metering-dispensing machine (not shown). Envelope end 68 is then folded over the cartridge bead 34 and held in position while the cartridge is charged with a predetermined quantity of base material in the same manner as the envelope was charged with catalyst. When the envelope and the cartridge have been charged with their respective materials, the plunger 42 and dasher 44, coupled together as hereinbefore described, are slidably inserted as a unit into the rear end of the cartridge 20 and are pushed down against the material in the cartridge to exclude air therefrom, the rear end of the envelope being held to prevent it from moving during insertion of the plunger and dasher. When thus assembled, the collapsed rear end portion 68 of the envelope 64 is held entrapped between the cylindrical skirt 48 of the plunger 42 and the interior cylindrical wall of the cartridge 20 as shown most clearly in FIG. 2, thereby closing the envelope and holding it in place within the cartridge. Closure cap 36 is then snapped on over the rear end of the cartridge, with the tab 40 of the cap disposed opposite the projecting end portion 68 of the envelope 64.

In order to use the device shown in FIG. 1, the cartridge is positioned with the spout 24 uppermost, and the plug 30 is threadedly disengaged from the cartridge spout, whereupon the projecting end 66 of the catalyst-containing envelope 64 is inserted into the cartridge 20 and the plug 30 re-inserted into the spout 24 to prevent accidental discharge of material through the outlet opening 26. With the open end 66 of the envelope disposed within the cartridge, the tab 40 on closure cap 36 is raised slightly to permit the envelope 64 to be withdrawn from the cartridge. By grasping the projecting end 68 of the envelope, the envelope may be pulled out the rear end of the cartridge between the plunger 42 and the interior cartridge wall stripping the envelope between the plunger skirt 48 and the cartridge 20. As the envelope is withdrawn, the catalyst material contained therein is distributed throughout substantially the entire length of the cartridge, and hence the catalyst is dispersed gradually into the base material in the cartridge, greatly assisting the mixing operation to provide a homogeneous mixture. Plug member 30 has a cylindrical passageway 70 therethrough, which is closed at the inner end of the plug by a frangible membrane 72 extending thereacross. Plug 30 also has an enlarged head portion 74 to facilitate threading the plug into and out of the cartridge spout 24. The threaded end 76 of actuating rod 58 is inserted through plug passageway 70 fracturing the membrane 72, and the rod 58 is extended through the cartridge and is threadedly engaged with the threads 56 in the hub portion 54 of the mixing dasher 44. Rod 58 may then be coupled to a suitable device for transmitting rotary motion thereto, or it may be manipulated manually to shift the dasher within the cartridge, mixing the component materials together. The amount of mixing required will be dependent upon the particular materials used, but in any event it is important that the dasher 44 be rotated and reciprocated within the cartridge to assure adequate mixing. Also, care must be taken to engage the mixing dasher against the conical forward end 22 of the cartridge and the conical wall 46 of the plunger during strokes in opposite directions, so that the resultant mixture will be uniform throughout. When the mixing is completed, the rod 58 should be pushed into the cartridge, re-engaging the dasher 44 on the projecting nose 60 of the plunger 42 and then the rod 58 unthreaded from the dasher 44 and withdrawn from the cartridge. Plug 30 is then removed from the cartridge spout 24, and a nozzle member suitable for the particular application engaged upon the spout threads 28 of the cartridge. Now ready for use, the device may be inserted in a sealant gun of the type disclosed in U.S. Patent No. 3,042,268, or may be used in a manually operated gun commercially available and commonly referred to as a "calking gun."

FIGS. 3–9 inclusive illustrate slight variations in the device disclosed in FIGS. 1 and 2, which variations will now be described with reference to the various figures, wherein the same reference numerals identify parts identical to those shown in FIG. 1. Referring first to FIG. 3, there is shown a modified catalyst envelope, and also illustrated is a method of making such an envelope. Two strips of material such as Mylar, referred to hereinabove, are juxtaposed and heat sealed together in a configuration indicated by the dotted lines shown at numerals 80, 82 and 83 in FIG. 3. The strips are then cut or separated on the double solid lines 84, 86 and 88 of FIG. 3 to provide separate envelopes, each having a reduced forward end portion 90. Catalyst envelopes of this construction are particularly suitable for use in the embodiments illustrated in FIGS. 4 and 5 of the drawings.

Referring now to FIG. 4, a catalyst envelope 78 made in accordance with the showing of FIG. 3, is positioned in the cartridge 20 in similar fashion to the envelope 64 of FIG. 1. As envelope 78 is provided with a seal along the dotted line 83, instead of being open at both ends, the envelope may be charged with catalyst prior to its insertion within the cartridge 20. To fill the envelope 78, catalyst may be pumped through a suitable nozzle into the opening in the forward end 90 of the envelope. When filled, the forward end portion 90 of the envelope is folded back upon itself, preferably twice as shown in FIG. 4, and the folds are held closed by a clamping member 92 of any suitable design, such as a strip of sheet metal bent over the folded envelope. Such a clamp is indicated at 92 in FIG. 4. Attached to the clamp 92 is an anchor strip or string 94, which may be made out of a thin strip of the same material as the envelope 78, or any other suitable material. Once the clamp 92 and the anchor strip 94 have been applied to the filled envelope 78, the envelope may be set aside and stored until required for the next operation. To complete the assembly, the envelope 78 containing catalyst material is inserted into the cartridge 20 shown in FIG. 4 with the anchor strip 94 projecting out the nozzle 24 of the cartridge, and the closure plug 30 is threadedly engaged with the spout 24, entrapping the anchor strip therebetween. As the envelope 78 is sealed as at 83 (see FIG. 3) the collapsed projecting portion 96 of the envelope entrapped between the plunger 42 and cartridge wall and projecting out the rear end of the cartridge is in collapsed condition and is not exposed to the catalyst material in the main portion of the envelope 78. With the envelope in the cartridge and the plug threaded into the spout, the cartridge is charged with base material in similar fashion as above described with regard to FIG. 1, and the assembly of the plunger 42 and dasher 44 is accomplished also in the same manner, and the closure cap is then snapped over the bead 34 at the rear end of the cartridge 20 with the projecting tab 40 disposed adjacent the protruding envelope end 96.

When the device of FIG. 4 is to be used, the tab 40 is raised slightly, and the projecting end 96 of the envelope is grasped, and the envelope is withdrawn through the rear end of the cartridge. Initial movement of the envelope 78 will disengage the clamp 92 from the forward end portion 90 of the envelope, as the anchor strip 94 is held against movement by the plug 30, and the envelope will thus be opened, dispersing catalyst throughout the length of the cartridge as the envelope is withdrawn therefrom. Actuating rod 58 is then inserted as above described and used to manipulate the dasher within the cartridge, mixing the component materials together. Rod 58 and plug 30 are then removed, and the anchor strip 94 with the clamp 92 attached is withdrawn through the spout 24 of the cartridge and a suitable dispensing nozzle threaded on the spout.

Shown in FIGS. 5 and 6 is a device identical to that shown in FIG. 4 except for the fact that the anchor strip 94 is eliminated, and the clamp 92 is replaced by a similar clamp shown at 100 in FIGS. 5 and 6. The envelope 78 is identical to that shown in FIGS. 3 and 4. The clamp 100 is of a generally U-shaped configuration, and is made of a readily deformable material such as soft metal or the like, which is positioned over the folded forward end 90 of the envelope 78 after the envelope has been filled, holding the envelope closed against escape of catalyst material. The assembly of the parts shown in FIG. 5 is identical to that discussed regarding FIG. 4, except that the plug 30 may be engaged within the cartridge spout 24 before insertion of the filled catalyst envelope 78, the anchor strip 94 having been eliminated. When the component materials are to be mixed within the cartridge 20, the projecting tab 96 of the catalyst envelope is pulled as before, and the increased fluid pressure within the envelope operates to dislodge the clamp 100 from the folded envelope end 90, opening the envelope and allowing the catalyst material to escape therefrom as the tab 96 is progressively pulled to strip the envelope out of the rear end of the cartridge.

Shown in FIGS. 7 and 8 of the drawings is a somewhat modified form of a device embodying the invention, differing from that shown in the preceding figures principally in that the catalyst envelope 110 is completely closed, and is contained entirely within the cartridge 20. Also, there is provided a perforated disc 112 having pointed prongs 114 projecting therefrom for piercing the envelope 110 to allow the escape of catalyst material therefrom. The catalyst envelope 110 may be made of Mylar, hereinabove described, and when the envelope is charged with catalyst material, it is completely closed, as by heat sealing, and is thereafter inserted in the cartridge 20 having the plug 30 threadedly engaged in its spout 24. Thereafter the cartridge 20 is charged with base material, and the assembly of plunger 42, dasher 44 and disc 112 thereafter inserted in the rear end of the cartridge 20, and the closure cap 36 snapped over the open rear end of the cartridge.

Referring to FIG. 7, the disc 112 shown therein is preferably made of thin sheet metal, formed to closely conform to the configuration of the mixing dasher 44 so as to lie flat thereagainst, and having an aperture 116 receivable over the hub 54 of the mixing dasher. Disc 112 may be perforated and the projecting prongs 114 formed simultaneously, by punching triangularly shaped portions out of the disc in the manner indicated in FIG. 9. In order to mix the component materials together within the cartridge 20, the rod 58 is inserted through the frangible membrane 72 in plug 30, and engaged in the hub portion 54 of the dasher. As the rod 58 is withdrawn, the pronged disc 112 carried by the dasher is shifted toward the envelope 110, and the prongs 114 perforate the envelope 110, allowing the catalyst therein to escape and to be mixed within the cartridge 20 with the base material. Also, as the dasher 44 and disc 114 are both rotated and reciprocated within the cartridge 20, the envelope 110 containing the catalyst material will become impaled upon the projecting prongs 114, and will be held impaled thereon during the subsequent dispensing of the mixture from the cartridge 20, obviating any possibility that the envelope material will become lodged in the cartridge outlet opening 26.

The embodiment shown in FIG. 8 differs from that of FIG. 7 in that the perforated disc 112' is formed as shown in FIG. 8 to juxtapose the rearwardly facing surface of the mixer dasher 44, with its prongs 114 projecting rearwardly therefrom. In assembly, the mixing dasher 44 and the disc 112' would be inserted into the cartridge 20 before the envelope 110 of catalyst material, and therefore the dasher and disc assembly would be normally disposed adjacent the conical forward wall 22 of the cartridge 20.

The envelope 110 filled with catalyst material would then be positioned as shown in FIG. 8 within the cartridge 20, and the plunger thereafter inserted into the rear end of the cartridge in the usual fashion. Closure cap 36 would also be installed in the usual manner. To mix the materials together, rod 58 would be threaded into the hub 54 on dasher 44, and further inward movement of the rod 58 would shift the disc 112' against the envelope 110 to puncture the envelope and distribute catalyst material into the cartridge 20 for mixing therein with the base material. Upon completion of mixing, the dasher 44 and disc 114 are positioned engaging the forward face of the plunger 42, entrapping the remains of the catalyst envelope between the forward face 46 of the plunger and the pronged disc 112'. This of course positively insures that the envelope 110 will not find its way into the cartridge outlet 26 to clog the outlet when the mixture is being dispensed from the cartridge.

In FIGS. 10–17 there is shown an embodiment of the invention incorporating a number of specific features which are advantageous. Throughout the following description of such figures, similar reference numerals will be used with reference to parts identical to those previously described. A standard plastic cartridge 20 is provided as before with a rear end closure cap 36 and a conical forward end 22 terminating in spout 24 which is externally threaded as at 28. Within the cartridge 20 at the rear end thereof is disposed a plunger 42 having a mixing dasher 200 seated thereon, which is shown in detail in FIGS. 15–17 and described hereinafter.

A catalyst envelope 202 is disposed within the cartridge 20 similarly to that shown in FIG. 5 for example, with a collapsed rear end portion 204 extending out the rear end of the cartridge between the plunger 42 and the cartridge wall and out under the cap 36. Shown in greater detail in FIGS. 13 and 14, the envelope 202 comprises two sheets 206 and 208 of Mylar heat sealed together along opposite marginal edges as at 210. The rear end 204 of the envelope is left open, while the forward end is closed by what might be termed a "soft" seal. Such is accomplished by placing a strip 212 of polyethylene in between the Mylar sheets and then heat sealing as at 214 across the area where the strip 212 is disposed. The resulting seal is much weaker than the seals 210, and hence as the rear end 204 of the envelope is gripped and pulled as hereinbefore described, the resulting increase in catalyst pressure inside envelope 202 ruptures the "soft" seal 214, and the envelope contents are distributed throughout the cartridge as the envelope is stripped out the rear end.

FIGS. 11 and 12 show novel mixing rod 216 and closure plug 218 adapting the unit to be conveniently packaged with the mixing rod disposed in the cartridge ready for use. The plug is similar to plug 30 in that it is externally threaded and provided with an enlarged head 74 for gripping with the fingers. Plug 218 has an axial bore accommodating the rod 216, and the bore exhibits an annular circumferential undercut 220, while rod 216 has a circumferential bead 222 thereon engaging the undercut. With the rod screwed into dasher 200 as shown in FIG. 10, and the dasher-plunger assembly bottomed in the cartridge 20, the engagement between bead 222 and undercut 220 releasably locks the rod against accidental axial movement during shipment or storage.

Rod 216 has a conventional handle 224 and also exhibits a radial shoulder 226. When the rod is engaged in the dasher 200 and the dasher and plunger disposed in proper position at the rear of cartridge 20, shoulder 226 abuts the end face 228 of plug 216 as shown. This relationship limits rod movement when the rod is reciprocated within the cartridge to mix the components together so that plunger 42 is not pushed out the rear end of the cartridge.

FIG. 12 shows the detail of the inner end of plug 216, which is provided with a lip seal 230 extending generally radially inwardly when in normal position, and deformable to embrace rod 216 when the same is inserted through the plug. Seal 230 prevents leakage of material from cartridge 20 along the rod 216 during shipment and/or storage, and also serves to wipe the rod as it is withdrawn from the cartridge during mixing. This last feature is important as it prevents a messy condition from occurring during mixing.

Turning now to FIGS. 15–17, there is shown the mixing rotor 200 having an internally threaded hub 232 apertured as at 234 to accommodate a nose on the plunger as previously mentioned above. Rotor 200 has a plurality of generally rearwardly extending, spaced-apart blades 236, in this case four, each of which is apertured as at 238. The blades have arcuate outer ends 240 adapted to intimately engage the interior cylindrical walls of a cartridge to insure complete mixing of any material that might be clinging thereto. Those portions of the blades which joint hub 232 to the outer end 240, which may be termed arms shown at 242 and 244, are axially displaced from each other on each blade. As can be seen, such a construction forces the materials being mixed to follow a tortuous path as the dasher is rotated to insure intimate mixing with a minimum amount of dasher manipulation. This is of course desirable, especially when the mixing is being carried out by hand. The dasher imparts high knead and shear forces to the material and intimately wipes against the cartridge wall to provide a thorough mixing operation.

The various parts are assembled similar to those described hereinbefore. The unit is shipped in the condition shown in FIG. 10, and as the envelope 202 is stripped out the cartridge rear end, the "soft" seal ruptures and catalyst is distributed into the base in the cartridge. While the "soft" seal has been shown closing one end of the envelope 202, it will be appreciated that the envelope could be completely closed by such a seal, and positioned entirely within the cartridge as shown at 110 in FIGS. 7 and 8. In such case the disc 112 would be eliminated, and the movement of the mixing dasher against the envelope breaks the "soft" seal, distributing the catalyst into the cartridge 20.

The outer ends 240 of the blades 236 may be interconnected by bridging portions to provide an uninterrupted peripheral ring wiping the cartridge wall. As the dasher 200 is made of fairly stiff material, such a construction would serve to provide a continuous edge against which the envelope 202 scrapes during its withdrawal from the cartridge 20. The dasher then will serve as an effective stripping element for envelope 202.

What is claimed is:

1. Apparatus of the character described, comprising, in combination: a cylindrical plastic cartridge containing a predetermined quantity of one flowable component material to be mixed, said cartridge having an open rear end and a front end defining a spout-like opening through which mixture may be dispensed; removable plug means normally blocking said spout opening against the escape of component material therethrough; a plunger member disposed in the cartridge adjacent the rear end thereof closely fitting the interior wall surface of the cartridge and shiftable toward the front end of the cartridge to dispense mixture therefrom; a mixing dasher disposed in the cartridge intermediate said plunger and said cartridge spout for reciprocal and rotational movement therebetween, said dasher defining a plurality of mixing blades having end portions contacting the interior wall surface of the cartridge for wiping contact thereagainst; a readily deformable closed envelope containing a predetermined quantity of a second component material disposed extending longitudinally within said cartridge; means for opening the envelope to dispense said second component material into said one component material within the cartridge; and actuating means releasably couplable to said mixing dasher for simultaneously rotating and reciprocating the dasher within the cartridge to mix said component materials together to provide a homogeneous mixture.

2. Apparatus of the character described comprising in combination: a cylindrical plastic cartridge containing a predetermined quantity of one flowable component material to be mixed, said cartridge having an open rear end and a front end defining a spout-like prolongation through which mixture is to be dispensed; a removable plug engaging said prolongation normally preventing discharge of said component materials; a cup-shaped plunger shiftably disposed in said cartridge adjacent the rear end thereof and having a cylindrical skirt portion closely fitting the cartridge interior cylindrical wall; a mixing dasher positioned in said cartridge intermediate said plunger and said spout for shiftable and rotatable movement within the cartridge to mix component materials together therein; and a readily deformable envelope containing a predetermined quantity of a second flowable component material extending longitudinally within the cartridge and having a collapsed end portion entrapped between said piston skirt and said interior cartridge wall and projecting therebeyond out the rear end of the cartridge, said envelope having an openable wall portion and being withdrawable outwardly through the cartridge rear end between the plunger and the cartridge wall to open said wall portion and strip said second component material out of the envelope, dispersing such material throughout said first component material in the cartridge for subsequent mixing by the mixing dasher and dispensing of the resultant mixture.

3. Apparatus of the character described, comprising in combination: a cylindrical plastic cartridge containing a predetermined quantity of one flowable component material to be mixed, said cartridge having an open rear end and a front end defining a spout-like prolongation through which mixture is to be dispensed; a removable plug engaging said prolongation normally preventing discharge of said one component material; a cup-shaped plunger shiftably disposed in said cartridge adjacent the rear end thereof and having a cylindrical skirt portion closely fitting the cartridge interior side wall; a mixing dasher positioned in said cartridge intermediate said plunger and said spout for reciprocable and rotatable movement within the cartridge to mix component materials together therein; and a readily deformable envelope containing a predetermined quantity of a second flowable component material positioned longitudinally within the cartridge and having a collapsed rear end portion extending out of the rear end of said cartridge entrapped between said plunger and said interior cartridge wall and a collapsed forward end portion extending out of the front end of the cartridge entrapped between said cartridge spout and said removable plug, said envelope being withdrawable out the rear end of the cartridge between the plunger and the cartridge wall upon removal of said plug releasing the envelope front end, to thereby strip said second component material out of the envelope dispersing such material into the cartridge for subsequent mixing by the mixing dasher and the dispensing of the resultant mixture.

4. Apparatus of the character described, comprising in combination: a cylindrical plastic cartridge containing a predetermined quantity of one flowable component material to be mixed, said cartridge having an open rear end and a front end defining a spout-like prolongation through which mixture is to be dispensed; a removable plug engaging said prolongation normally preventing discharge of said component material; a cup-shaped plunger shiftably disposed in said cartridge adjacent the rear end thereof and having a cylindrical skirt portion closely fitting the cartridge interior side wall; a mixing dasher positioned in said cartridge intermediate said plunger and said spout for shiftable and rotatable movement within the cartridge to mix component materials together therein; and a readily deformable envelope containing a predetermined quantity of a second flowable component material extending longitudinally within the cartridge and having a collapsed rear end portion entrapped between said piston and said cartridge side wall and projecting therebeyond out the rear end of the cartridge and a collapsed forward end portion folded upon itself; means engaging said forward envelope end portion to releasably hold the same in folded condition against the escape of component material therefrom, said envelope being withdrawable out the rear end of the cartridge between the piston and cartridge interior side wall when said means is released from the envelope to strip said second component material out of the envelope dispersing such material throughout said first component material in the cartridge for subsequent mixing by the mixing dasher and dispensing of the resultant mixture.

5. The invention as defined in claim 4 characterized in that said means engaging said forward envelope end portion comprises a clip slidably engaged over the folded envelope portion and an anchoring strip connected to the clip and projecting out of the cartridge between the interior wall of said spout and said plug whereby said clip is released from engagement with the envelope when the envelope is withdrawn out the rear end of the cartridge.

6. The invention as defined in claim 4 characterized in that said means engaging said forward end portion of the envelope comprises a readily deformable U-shaped clamp positioned with the folded envelope portion releasably gripped between the legs of said clamp whereby the clamp is forced from the folded envelope portion by component material pressure exerted thereon as the envelope is withdrawn from the cartridge rear end.

7. Apparatus of the character described, comprising in combination: a cylindrical plastic cartridge having an open rear end and a conical forward end provided with a nozzle opening therethrough at its apex; a closure plug releasably engaged with said nozzle blocking the opening, said cartridge being partially filled with a predetermined quantity of a first flowable component material to be mixed; a cup-shaped plastic plunger having a substantially cylindrical portion extending rearwardly of a conical forward end portion with the cylindrical portion intimately slidably engaging the interior wall surface of the cylindrical cartridge and normally disposed at the rear end of the cartridge and shiftable toward said nozzle opening to dispense mixed material therefrom; a mixing dasher having blade portions engaging the interior wall of the cartridge normally positioned immediately forward of said plunger and being slidably reciprocable and rotatable within said cartridge for mixing component materials together to form a homogeneous mixture, said dasher having respective forward and rear faces conforming to the conical surface of said cartridge forward end and the conical surface of said plunger forward end for intimate wiping contact against said surfaces upon abutment of the dasher thereagainst during mixing; and a readily deformable envelope containing a predetermined quantity of a second flowable component material disposed extending longitudinally within the cartridge substantially the entire length thereof and having a collapsed rear end portion grippingly engaged between the interior wall surface of the cartridge and said cylindrical portion of said plunger and projecting therebeyond out the rear end of the cartridge, said envelope being withdrawable out of the rear end of the cartridge between the plunger and the cartridge wall to strip the second flowable component material from the envelope, dispersing said second material into said first material throughout substantially the entire length of the cartridge for subsequent mixing together of the component materials by the mixing dasher and thereafter dispensing of the resultant mixture through said nozzle opening.

8. The invention as defined in claim 7 characterized in that the end of said deformable envelope disposed adjacent the forward end of said cartridge is held closed against accidental escape of said second component material by a releasable clamp member provided with anchoring means projecting out of the cartridge nozzle and grippingly held between the nozzle wall and said closure plug, whereby said clamp member is disengaged from the envelope upon initial withdrawal of the envelope out of the rear end of the cartridge.

9. The invention as defined in claim 7 characterized in that said deformable envelope includes a collapsed forward end portion projecting out of the forward end of the cartridge and grippingly sealingly held against the escape of said second component material from the envelope by engagement between the interior cartridge nozzle wall and said closure plug.

10. The invention as defined in claim 7 characterized in that said cup-shaped plunger and said mixing dasher are disconnectably coupled together by means of the engagement therebetween of an axial pin projecting from one of said parts slidably releasably engaged within a cooperating recess in the other of said parts.

11. The invention as defined in claim 7 characterized in that said mixing dasher exhibits an integral forwardly projecting hub portion, and there is provided a substantially rigid mixing rod receivable through the nozzle portion of said cartridge, with said dasher hub portion and said rod being releasably engageable to permit manipulation of the dasher within the cartridge by the rod.

12. The invention as defined in claim 11 characterized in that said closure plug is provided with a cylindrical axial passageway therethrough and a frangible membrane extending sealingly across said passageway, with said mixing rod being slidably insertable through the passageway to fracture said membrane upon insertion of the rod for coupling with said mixing dasher.

13. Apparatus of the character described, comprising in combination: a cylindrical plastic cartridge containing a predetermined quantity of one flowable component material to be mixed, said cartridge having an open rear end and a front end defining a spout-like prolongation through which mixture is to be dispensed; a removable plug engaging said prolongation normally preventing discharge of said component material; a cup-shaped plunger shiftably disposed in said cartridge adjacent the rear end thereof and having a cylindrical skirt portion closely fitting the cartridge interior side wall; a mixing dasher positioned in said cartridge intermediate said plunger and said spout for shiftable and rotatable movement within the cartrdge to mix component materials together therein; a readily deformable closed envelope of frangible material having sealed therein a predetermined quantity of a second flowable component material, said envelope positioned extending longitudinally within the cartridge; and a perforated disc engaging said mixing dasher and shiftable therewith within said cartridge, said disc having means thereon for fracturing said envelope upon shifting of the disc thereagainst to allow escape of said second component material from the envelope to be mixed with said one component material during shiftable movement of the dasher within the cartridge.

14. The invention as defined in claim 13 characterized in that said mixing dasher is normally positioned at the rear end of said cartridge immediately forward said plunger with said perforating disc engaging the dasher forward face and said envelope diposed intermediate the disc and the forward end of the cartridge, and said means on the disc comprises pointed prong-like projections for fracturing said envelope with the envelope material being impaled on said prongs upon movement of the dasher and disc against the cartridge forward end, thereby preventing the envelope from becoming lodged in the cartridge spout opening during dispensing of said mixture.

15. The invention as defined in claim 13 characterized in that said dasher is normally positioned adjacent the forward end of said cartridge with the perforated disc engaging the rear face of the dasher, and said envelope of said second component material positioned intermediate said disc and said plunger, said means on the disc comprising pointed prong-like projections for fracturing said envelope with the envelope material being impaled on said projections upon movement of the dasher and disc against the plunger forward face, thereby preventing the envelope material from blocking the cartridge spout opening during dispensing of said mixture.

16. Apparatus of the character described comprising, in combination: a cylindrical plastic cartridge containing a predetermined quantity of one flowable component material to be mixed, said cartridge having an open rear end and a front end defining a spout-like prolongation through which mixture is dispensed; a removable sleeve-like plug engaging said prolongation normally preventing discharge of said materials; a cup-shaped plunger shiftably disposed in said cartridge adjacent the rear end thereof and having a cylindrical skirt portion closely fitting the cartridge interior cylindrical wall; a mixing dasher positioned in said cartridge normally engaging the plunger forward end and being shiftable and rotatable within the cartridge for mixing component materials together therein; a mixing rod normally positioned extending through said plug and releasably engaging said mixing dasher for manipulating the dasher within the cartridge; and a readily deformable envelope containing a predetermined quantity of a second flowable component material positioned within the cartridge and having a fracturable wall portion openable to disperse said second material into said first material within the cartridge for subsequent mixing by the mixing dasher and dispensing of the resultant mixture.

17. The invention as defined in claim 16 characterized in that said sleeve-like plug has an internal, annular recess therealong and said mixing rod has a circumferential bead engaged in said recess when the rod is in its normal position in the cartridge to releasably lock the rod against accidental axial movement.

18. The invention as defined in claim 17 characterized in that said rod exhibits a radial shoulder adapted to abut the outer face of said sleeve-like plug when the rod is positioned within the cartridge to limit axial insertion of the rod into the cartridge.

19. The invention as defined in claim 16 characterized in tht said sleeve-like plug exhibits a radially inwardly extending flexible wiping lip portion adapted to intimately encircle said mixing rod preventing escape of materials from the cartridge and wiping material from the rod during its mixing movement in and out of the cartridge.

References Cited by the Examiner
UNITED STATES PATENTS

| | | | |
|---|---|---|---|
| 381,553 | 4/88 | Hollis | 222—386 |
| 2,921,718 | 1/60 | Meissner | 222—103 |
| 2,954,144 | 9/60 | Elam et al. | 259—98 X |
| 3,140,078 | 7/64 | Krahe | 259—47 |

CHARLES A. WILLMUTH, *Primary Examiner.*